Sept. 9, 1969  E. A. EDWARDS ET AL  3,465,980
REEL AND FILM RETAINING MEANS
Filed Nov. 24, 1967  2 Sheets-Sheet 1
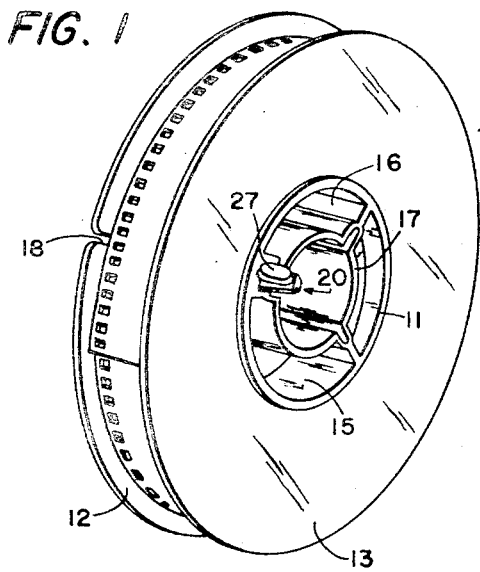
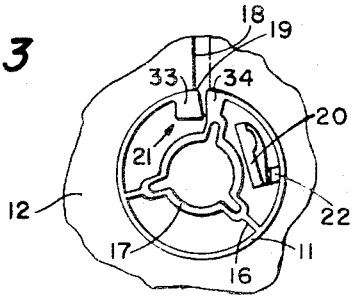
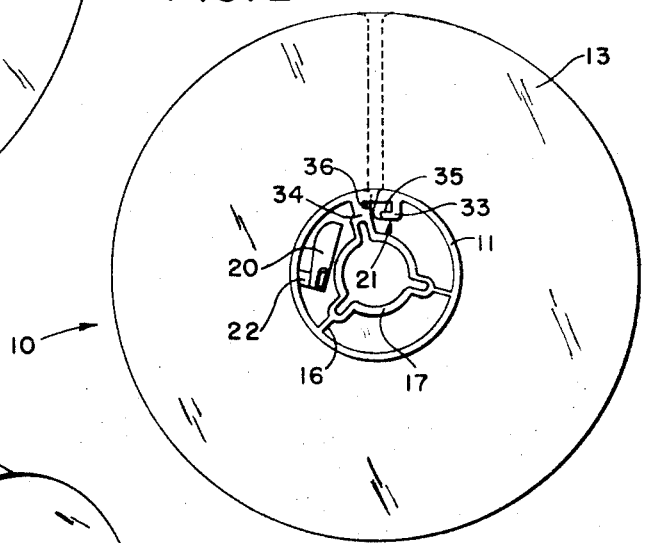
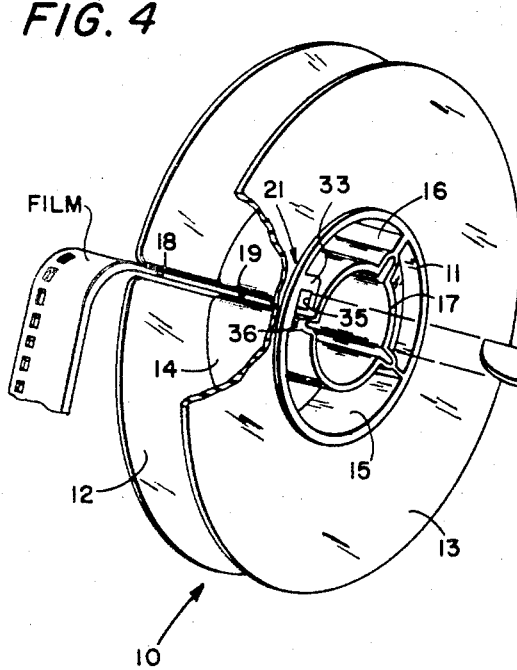
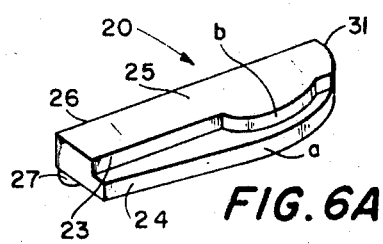
EVAN A. EDWARDS
ROBERT J. ROMAN
LAWRENCE A. ULMSCHNEIDER
INVENTORS
BY
ATTORNEYS Sept. 9, 1969  E. A. EDWARDS ET AL  3,465,980
REEL AND FILM RETAINING MEANS
Filed Nov. 24, 1967  2 Sheets-Sheet 2

EVAN A. EDWARDS
ROBERT J. ROMAN
LAWRENCE A. ULMSCHNEIDER
INVENTORS

BY
ATTORNEYS

United States Patent Office 3,465,980
Patented Sept. 9, 1969

3,465,980
REEL AND FILM RETAINING MEANS
Evan A. Edwards, Lawrence A. Ulmschneider, and Robert J. Roman, Rochester, N.Y., assignors to Eastman Kodak Company, Rochester, N.Y., a corporation of New Jersey
Filed Nov. 24, 1967, Ser. No. 685,631
Int. Cl. B65h 75/28
U.S. Cl. 242—74.1     10 Claims

ABSTRACT OF THE DISCLOSURE

An improved pin and socket assembly for releasably securing an elongated web or film to a supply reel or other structure. The pin is specially shaped for optimum retaining characteristics, and may have an extended head portion to prevent improper positioning of the reel in a reel cartridge or other container.

CROSS-REFERENCES TO RELATED APPLICATIONS

Reference is made commonly assigned U.S. application Ser. No. 685,589, entitled Reel and Web Retaining Means Therefor, filed in the name of Morris E. Brown on Nov. 24, 1967; and commonly assigned U.S. application Ser. No. 685,597, entitled Cartridge and Reel Alignment Means, filed in the name of Arthur H. Crapsey on Nov. 24, 1967; and commonly assigned U.S. application Ser. No. 685,615, entitled Reel With Attached Film Retaining Means, filed in the name of James J. Wenskus on Nov. 24, 1967.

BACKGROUND OF THE INVENTION

The present invention relates to a means for releasably securing the end of an elongated web to a reel, and to means for assuring proper orientation of a reel when it placed in a cartridge or other compartment.

While applicable to different types of apparatus, the present invention has particular utility in the field of motion picture projectors, and specifically to cartridge-loaded projectors which automatically rewind the film at the end of the projection cycle. In such projectors, the film supply reel is received in a cartridge removably mounted on a projector. A stripper mechanism, incorporated into the projector, strips the leading film end from the supply reel and directs the same into an automatic threading mechanism which threads the film to a projection gate. One end of the film is anchored to the supply reel and a rewind cycle is activated automatically in response to a pronounced increase in film tension, as will occur when the projection feeding mechanism attempts to pull the anchored end of the film from the reel.

A retaining means for securing the end of a film to a supply reel and for insuring proper orientation of a reel within a cartridge is disclosed in commonly assigned copending U.S. application Ser. No. 685,589, entitled Reel and Web Retaining Means Therefor, filed in the name of Morris E. Brown on Nov. 24, 1967 and in commonly assigned copending U.S. application Ser. No. 685,-597, entitled Cartridge and Reel Alignment Means, filed in the name of Arthur H. Crapsey on Nov. 24, 1967. The present invention constitutes an improvement over the retaining and orienting means disclosed in said copending applications.

While the film retaining means and reel orientating means disclosed in the aforementioned applications serve the intended purposes, they have certain disadvantages. For example, the pin disclosed may not remain locked in its retaining position if the film should by chance become set or deformed as a result of long term storage. Moreover, the shear forces set up in the film by the disclosed retaining means tend to initiate tears which begin at the edge portions of the film and progress inwardly until the film is severed. In addition, formation of the pin disclosed in said applications requires a separate molding or forming step, which increases the cost of the reel and pin combination.

SUMMARY OF THE INVENTION

An object of the present invention, is to provide a film retaining means, all parts of which may be molded in a single operation with the reel itself.

Another object is to provide a film retaining pin which will remain attached to a reel until use.

A still further object is to provide a retaining pin which will remain in its socket even after the film has become set or permanently deformed in its retained position.

In a disclosed embodiment of the invention a film reel is provided with a socket arranged to have a film threaded therethrough. A pin which may be initially molded as an integral part of the reel structure may be inserted into the socket to frictionally engage and retain the film therein. A film engaging edge of the pin is curved to engage the center portion of a web or film more securely than the edge portions thereof. This pin shape reduces the chance of film tear and the chance that the pin will become displaced from the socket if the film should deform or take a set.

Other objects and advantages will become apparent from the following description of an illustrative preferred embodiment of the invention.

BRIEF DESCRIPTION OF THE DRAWINGS

In the drawings:
FIG. 1 is a perspective view of a supply reel having a film retaining means in accordance with the invention;
FIG. 2 is a rear elevational view of the reel shown in FIG. 1;
FIG. 3 is a front view of the hub portion of the reel shown in FIG. 1;
FIG. 4 is a perspective view of the reel with a portion thereof broken away, showing the manner in which the film end is threaded into the film retaining means;
FIGS. 6 and 6A are enlarged perspective views of the film retaining pin.

DETAILED DESCRIPTION OF PREFERRED EMBODIMENTS

Figure 5:
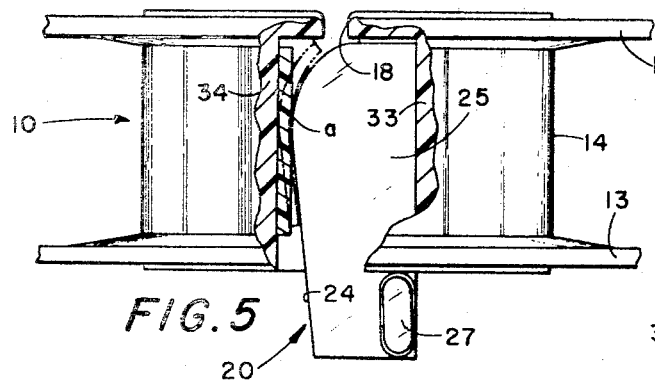
FIG. 5 is a fragmentary side view of the reel in partial section to show the film secured by the retaining pin and the manner in which the pin is retained in its socket after the film has taken a set about the pin.

Referring to the drawings, a supply reel 10 is disclosed comprising a hub 11 and side-flanges 12 and 13, respectively, extending radially outwardly from the periphery of hub 11 and spaced along the hub axis by a distance slightly greater than the width of film or other elongated material to be received on the reel 10. The hub has a peripheral wall defining an outer annular surface 14 (FIG. 4) for supporting the film convolutions and an inner surface 15 from which arms 16 extend radially inward to a central core 17 having a central opening for receiving the spindle of a movie projector (not shown).

Side-flange 12 of the reel 10 has a radial break 18 therein to facilitate insertion of film in a film threading opening 19 in the peripheral wall of hub 11.

In FIGURES 2 and 3, one embodiment of a film retaining means in accordance with the invention is disclosed. This means comprises a film retaining pin 20 and a pin receiving socket 21 which are molded or formed as an integral part of reel 10 on inner surface 15 of hub 11. As one feature of the embodiment disclosed, pin 20 and socket 21 are molded in one operation and as one piece with the supply reel 10, such that pin 20 is attached to reel 10 at an otherwise unused portion of the reel hub 11 by a thin connecting web 22. Socket 21, on the other hand, is located near and is formed by part of a radial arm 16 in such a manner that it will receive added support and rigidity therefrom. However, as would be obvious to one skilled in the art, other features of the invention are not dependent on such integral molding and the pin and socket can be separately formed if desired to achieve such other features.

Figure 6:
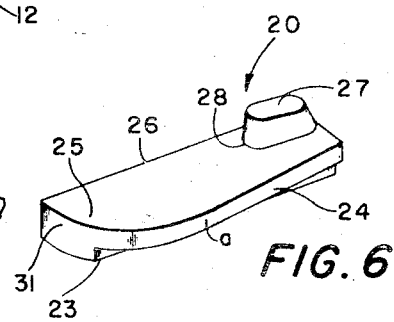

The particular shape of retaining pin 20 is most clearly shown in FIGS. 6 and 6A. More specifically, the pin 20 has an asymmetrical cross section defining a relatively thick elongated portion 23 having a narrower film engaging edge portion 24 projecting therefrom along the length thereof and defining a convexly curved film engaging edge surface $a$. The pin also defines a flat recessed surface along the portion 23 which defines a small convexly curved film engaging surface $b$ aligned with the surface $a$.

The pin 20 further defines flat sides 25 and a flat edge portion 26 for properly aligning the pin 20 in the socket 21. On one flat side 25 of pin 20 is located a stop member 27 having a forward end abutment 28 (FIGURE 6), the function of which will be described more fully hereinafter.

The leading or bight portions of the surfaces $a$ and $b$ of pin 20 are located substantially halfway between the forward end 28 of stop member 27 and the tip end 31 of pin 20, and the distance between the forward end 28 of the stop member 27 and the tip end 31 of the pin is approximately equal to the axial length of hub 11. With this arrangement, the surfaces $a$ and $b$ exert maximum pressure on the central portion of the film as will later be described in more detail.

Referring again to FIGS. 1, 2, and 9, socket 21 comprises a protuberance 33 extending along the inner surface 15 of hub 11 and a portion 34 of one of the radial arms 16. The protuberance 33 and portion 34 extend along the axial length of the hub 11 and are located on opposite sides of and define an extension of the retaining slot 19, but are close enough together to produce a light frictional retaining effect on a film threaded therethrough in the manner indicated in FIG. 9.

For receiving portion 23 of pin 20, protuberance 33 defines a slot 35 along substantially the entire axial length of the hub. The portion 34 of radial arm 16, on the other hand, contains a similar but narrower slot 36 for receiving the portion 24 of the pin 20. It will be apparent that the arrangement of slots 35 and 36 is such that the pin can be inserted into socket 21 only when the portions 23 and 24 are aligned with slots 35 and 36.

Figures 8, 9:
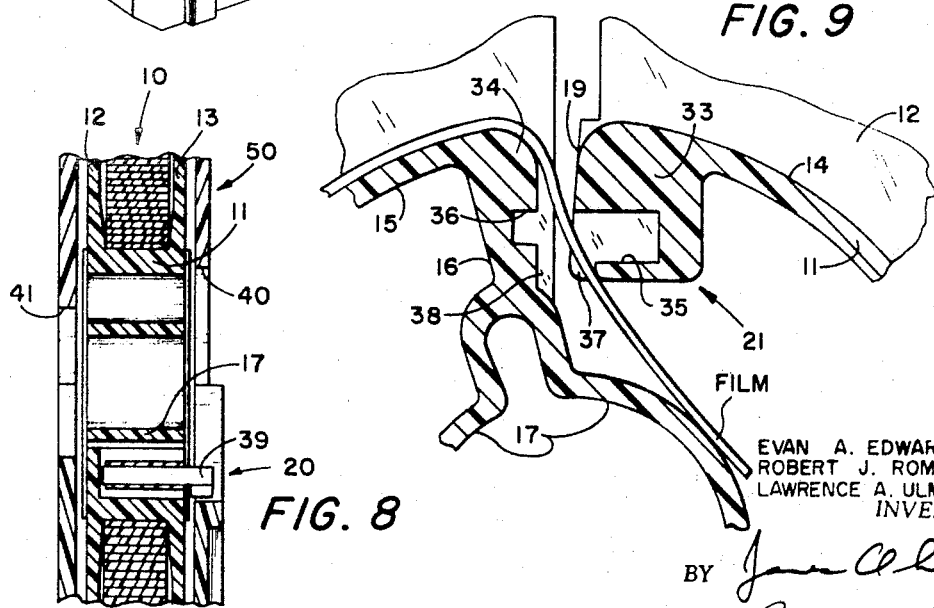
FIG. 8 is a fragmentary side view in section showing the relative sizes of the central openings in the cartridge, and the orienting function of the retaining pin.
FIG. 9 is an enlarged fragmentary sectional view of the retaining pin socket showing the film inserted therein.

Referring in detail to FIG. 9, the socket 21 defines an abutment or film alignment means comprising lips 37 and 38 on the side from which the film is inserted. More specifically, the lip 37 is defined by the protuberance 33 on one side of the slot 19 at the lower end thereof while the lip 38 is defined by the portion 34 on the same side of the slot 19 as the portion 34 along the length thereof as viewed in FIG. 9. Because of the tendency of the film to remain substantially straight, and the position of the core 17, which urges the film to one side (the right as viewed in FIG. 9), the edge of the film will engage the edges of lips 37 and 38. This will effectively trap the film such that it will not be pushed out of the core when the retaining pin is inserted from the opposite side.

Figure 10:
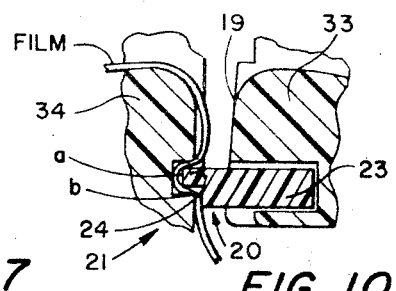
FIG. 10 is an enlarged fragmentary sectional view of the retaining pin socket showing the retaining pin inserted therein.

In operation of the retaining means, a strip of film is inserted into retaining slot 19 and between protuberance 33 and portion 34 of socket 21 as shown in FIG. 9. After the film is wound onto the reel, for example in the film processing laboratory or on a projector, pin 20 is inserted into socket 21, until stop member 27 abuts against the edge of protuberance 33, thereby locking the film to the reel. As the pin 20 is inserted into socket 21 the projecting edge portion 24 forces a portion of the film into the slot and bends it into a bulged U-shaped configuration within the slot 36 as shown in FIG. 10. The U-shaped portion of the film thus formed in the slot 36 will selectively engage the side and bottom wall surfaces of the slot 36, the edges of the surface $a$ and the side surfaces of the edge portion 24, depending on the radii of the film bends thus formed. In addition the curved surface $b$ of the pin 20 will engage and force the portion of the film immediately below the slot 36 (as viewed in FIG. 10) against the surface of portion 34 of arm 16 to thus establish frictional retention of said film portion. The frictional retaining force thus established by surface $b$ and the adjacent surface of portion 34 tends to supplement the effective frictional retaining force established by portion 24 and slot 36. When the film is subjected to a pulling force tending to remove it from the socket 21, the frictional retaining force established by surface $b$ adds to the frictional resistance established by surface $a$ and the surfaces of slot 36.

Since, as previously described, the bight portions of the surfaces $a$ and $b$ are halfway between forward end 28 of stop 27 and end 31 of pin 20, frictional retaining pressure between said surfaces and the film will be greatest at the center portion of the film. This not only reduces the chance of film tear, but also acts to retain the pin 20 in operative position even after the film has relaxed or taken a set about the pin, as shown in phantom in FIG. 5 where the film is depicted as it might appear after it has deformed about the curved edge of the pin.

Figure 7:
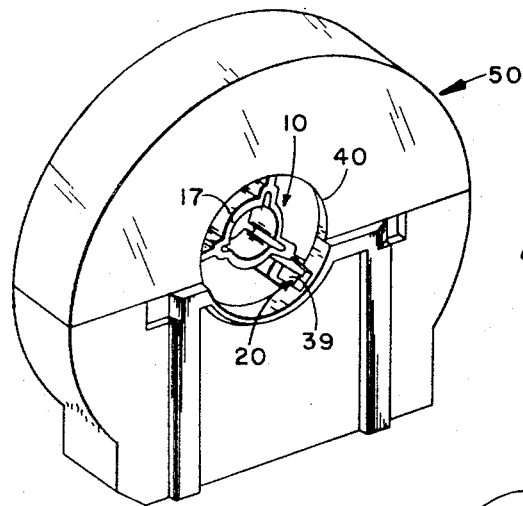
FIG. 7 is a perspective view of the reel positioned in a cartridge.

Stop member 27 also serves to prevent the entire pin length from being inserted into socket 21, such that an extended portion 39 (FIGS. 7 and 8) of the pin may be used to insure proper orientation of the supply reel when it is placed in a reel cartridge 50 or other compartment adapted to permit rotation of the reel relative thereto. As shown in FIGS. 7 and 8, such a cartridge has opening 40 and 41 for receiving a reel spindle of a motion picture projector. Opening 40 is shown as having a greater radius than the distance between extended portion 39 of pin 20 and the center of revolution of reel 10. Thus, when the reel is properly inserted into the cartridge, as shown on FIG. 7, pin 20 will extend through opening 40 and the reel will rotate freely. On the other hand, opening 41 has a smaller radius than opening 40. If it is attempted to insert the reel into the cartridge 50 improperly, interference between the pin and the edges of opening 41 will result.

In the particular embodiment disclosed, extended portion 39 of pin 20 projects from the back side of the reel 10 and cartridge 50. This orientation is preferable since there is usually more wall thickness on the back side of the cartridge, and the extended portion will not project beyond the wall surface of the cartridge. Moreover, since the film perforations are on the opposite side, the pin is inserted against the side of the film which will take the most abuse. However, it will be obvious to those skilled in the art, that the pin could be inserted from either side of the reel, and that the extending portion 39 could extend from either side of the reel.

It should also be obvious to those skilled in the art that the disclosed retaining means could be used in tape recorders, computers and other devices where it is desired to secure a strip of material to a reel, or to some other structure.

The invention has been described in detail with particular reference to preferred embodiments thereof, but

We claim:
1. Means for releasably securing an end portion of an elongated web to a web storage device such as a film reel, comprising:
   means defining a socket on the device having a slot therethrough for receiving a portion of the web in said socket, said socket defining a first elongated recess on one side of said slot and a second elongated recess having dimensions different from said first recess on the other side of said slot;
   and an elongated retaining pin adapted to be inserted in said socket to frictionally engage and retain the web therein, said pin having a first elongated portion adapted to be received in said first recess of said socket and a second elongated portion adapted to be received in said second recess.

2. Means for releasably anchoring an end portion of an elongated web to a web storage device such as a film reel, comprising:
   a hub having an outer web supporting surface and an inner surface;
   said hub defining a web-receiving opening extending radially through said outer surface and extending axially through one side of said hub such that the end portion of the web may be inserted edgewise into said opening from said one side of said hub;
   an asymmetrical socket on said inner surface of said hub, said socket having a web-receiving slot therethrough aligned with said opening whereby the web is positioned in said socket upon edgewise insertion thereof into said opening in said hub;
   a retaining pin adapted to be inserted in said socket from the other side of said hub to engage and frictionally retain the web within said socket; and
   abutment means in said socket adjacent said one side of said hub adapted to be engaged by the web to prevent displacement of the web during insertion of said pin from said other side of said hub.

3. In a film reel having a hub portion adapted to have film wound thereon, the combination comprising:
   means defining an elongated socket in said hub adapted to have the film threaded therethrough,
   said socket defining an elongated slot extending transversely of the film;
   an elongated film retaining member adapted to be inserted in said socket and having an elongated edge portion adapted to be received by said slot when said retaining member is inserted in said socket;
   a first convexly curved film engaging surface on said edge portion adapted to engage and bend a portion of the film into said slot upon insertion of said film retaining member into said socket;
   and a second convexly curved film engaging surface on said retaining member adapted to frictionally engage another portion of the film adjacent said slot.

4. In a film reel the combination claimed in claim 3 wherein said first and second curved surfaces have bight portions adapted to exert maximum pressure on the central portion of the film in said socket.

5. In a film reel, the combination comprising:
   a hub for receiving film wound thereon;
   means defining a socket in said hub having a slot for threading film therethrough;
   an elongated film retaining member adapted to be slidably inserted in said socket, said member having an elongated edge portion defining a first convexly curved surface for engaging a portion of the film in said slot and a second convexly curved surface for engaging another portion of the film in said slot.

6. A film retaining pin for releasably securing film to a reel, said reel having an elongated socket provided with a slot for receiving an end portion of the film, said pin comprising an elongated member having an elongated edge portion defining a first convexly curved film engaging surface and a second convexly curved film engaging surface, whereby a portion of the film is engaged by the first convex surface and another portion of the film is engaged by the second convex surface upon insertion of said member into the socket.

7. A film reel for use with an elongated film retaining pin having an asymmetrical cross-section and having a first elongated edge portion and a second elongated edge portion having dimensions different from said first elongated edge portion, said reel comprising:
   a hub for receiving film wound thereon;
   an elongated socket in said hub having a slot therethrough for receiving a portion of the film in said socket, said socket defining a first elongated recess on one side of said slot and a second elongated recess, said first recess having dimensions adapted for cooperation with the first elongated portion of the pin, said second elongated recess having dimensions adapted for cooperation with the second elongated portion of the pin.

8. A film retaining pin as claimed in claim 6 further including an abutment on said elongated member engageable with the socket to determine the axial position of said pin within the socket.

9. A film retaining pin for releasably securing film to a reel having an elongated socket provided with a slot for receiving an end portion of the film and provided with an elongated recess said pin comprising:
   an elongated member adapted to be inserted into the socket;
   a first elongated convexly curved surface on said member adapted to engage and bend the film into the recess upon insertion of the member into the socket; and
   a second convexly curved surface adapted to frictionally engage the film adjacent the recess.

10. A film retaining pin as claimed in claim 9 wherein said first and second curved surfaces have aligned bight portions which engage central portions of the film.

References Cited
UNITED STATES PATENTS

| | | | |
|---|---|---|---|
| 3,062,468 | 11/1962 | Braun | 242—74 |
| 3,220,665 | 11/1965 | Modrey | 242—74.1 |
| 3,312,413 | 4/1967 | Bernstein | 242—74.2 |

NATHAN L. MINTZ, Primary Examiner